United States Patent [19]

Boucherie

[11] Patent Number: 4,768,837
[45] Date of Patent: Sep. 6, 1988

[54] BRUSH BODY HOLDER

[75] Inventor: Leonel Boucherie, Roeselare-Rumbeke, Belgium

[73] Assignee: Firma G.B. Boucherie, naamloze vennootschap, Izegem, Belgium

[21] Appl. No.: 833,116

[22] Filed: Feb. 26, 1986

[30] Foreign Application Priority Data

Mar. 14, 1985 [EP] European Pat. Off. ... PV 85200380.5

[51] Int. Cl.⁴ .............................................. A46D 3/04
[52] U.S. Cl. ......................................... 300/4; 300/8; 300/10
[58] Field of Search ...................... 300/2, 3, 4, 5, 8, 9, 300/10, 11, 17

[56] References Cited

U.S. PATENT DOCUMENTS

| | | |
|---|---|---|
| 1,125,136 | 1/1915 | Liebig ........................................ 300/8 |
| 2,396,941 | 3/1946 | Corrigan et al. . |
| 2,433,192 | 12/1947 | Baumgartner . |
| 2,851,308 | 9/1958 | Karle et al. . |

FOREIGN PATENT DOCUMENTS

| | | |
|---|---|---|
| 637998 | 11/1936 | Fed. Rep. of Germany . |
| 976592 | 12/1963 | Fed. Rep. of Germany . |
| 1191334 | 5/1964 | Fed. Rep. of Germany . |
| 3146183 | 11/1981 | Fed. Rep. of Germany . |
| 275692 | 8/1927 | United Kingdom . |
| 296687 | 9/1928 | United Kingdom . |
| 1073132 | 6/1967 | United Kingdom . |

*Primary Examiner*—Timothy V. Eley
*Attorney, Agent, or Firm*—Foley & Lardner, Schwartz, Jeffery, Schwaab, Mack, Blumenthal & Evans

[57] ABSTRACT

An apparatus for positioning or holding a brush body for insertion of bundles of bristles is provided. The apparatus comprises a carrier movable relative to a fixed guide and having a pivotable brush body holding mounted to it. A follower slidably mounted on the carrier is biased to follow the fixed guide as the carrier moves. A pivotal connection between the follower and the holder causes the holder to pivot as the follower follows the fixed guide. Use of a specifically contoured fixed guide permits corresponding pivoting of the holder so that the brush body can be variably aligned to accommodate a range of bristle inserters.

12 Claims, 2 Drawing Sheets

4,768,837

BRUSH BODY HOLDER

BACKGROUND OF THE INVENTION

1. Field of the invention

This invention concerns an improved brush body holder, in particular a brush body holder which is rotatable in a plane parallel to the plane formed by the clamped brush body.

More particularly, the invention concerns a brush body holder which is rotatable with respect to a carrier upon which one or more such brush body holders may be fitted and whereby through intermittent movements this carrier places each brush body holder successively in front of various different processing tools and whereby each brush body holder, depending upon its situation, may or may not be presented at a desired angle with respect to the tool according to a desired pattern (with well-known brush manufacturing machines the above-mentioned carriers can be of the drum, chain, frame or table type).

In a particular application, the invention concerns a brush body holder which is rotatable with respect to a drum brush holder upon which several such brush body holders are fitted around the periphery, e.g. such as used for the manufacture of toothbrushes, nailbrushes and other types of precision brushes.

2. Discussion of the Prior Art.

It is well-known that in the manufacture of brushes, and in particular toothbrushes, especially as bundles of bristles are fitted into the brush bodies, the so-called staples or anchors with which the bundles of bristles are attached into the brush bodies are preferably fitted at a specific angle with respect to the principal shafts along which the holes in the brush body which are to be filled are located.

This prevents the brush bodies from cracking or splitting due to weakening along the direction in which the staples or anchors are fitted. This latter is of especial importance in the manufacture of toothbrushes, in which the shortest connecting distance between the holes to be filled is extremely small and thus a crack can easily form.

In well-known brush manufacturing machines of the type in which several brush body holders are fitted onto a drum, these brush body holders are not rotatable in a plane parallel to the plane formed by the clamped brush body.

Introducing the staples or anchors at an angle is thus performed by placing the filling mechanism through which the bristles are fitted into the brush body at a specific angle. However, a disadvantage of such a mechanism is that both the filling tool and the bistle container are located at an angle, thus making it difficult to feed the bristles into the bristle container or the bristle store.

Other well-known applications are fitted with brush body holders which are attached to the drum at a specific, predetermined angle or with a drum with brush body holders which lie overall at an angle.

There are various disadvantages to such mechanisms. First and foremost, when changing over to another angle, e.g. when another type of brush is to be manufactured, either the entire drum or the brush body holders have to be completely detached each time and reattached at another angle. Moreover, all the manufacturing tools which are fitted alongside the aforementioned drum also have to be manufactured so that they are adjustable to different angles.

SUMMARY OF THE INVENTION

In order to offer a solution to these and other disadvantages, this invention provides for an improved brush body holder of the type which is fitted onto a carrier of a brush manufacturing machine, with the characteristic that it is rotatable with respect to this carrier in a parallel plane to the plane of the brush body in which the bundles of bristles are attached.

BRIEF DESCRIPTION OF THE DRAWINGS

With a view to demonstrating the characteristics of the invention to better advantage, a description is given below, purely by way of an example and without any limiting character, of a preferred form of application applied onto a brush manufacturing machine with a drum-type brush body holder, with reference to the accompanying sketches in which.

DETAILED DESCRIPTION OF THE PREFERRED EMBODIMENTS

Figure 1:
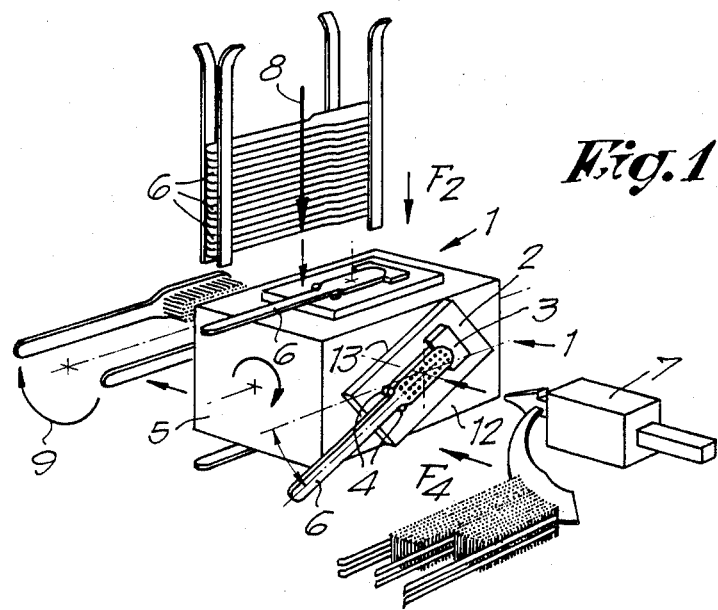
FIG. 1 shows a schematic view of a drum with several brush body holders as described by the invention, in which these are fitted along the periphery of this drum.

As shown in the figures above, the brush body holder 1 consists primarily of a component 2 upon which a number of brush body clamps are fitted. These brush body clamps can, for example, be formed by a stop 3 and a number of movable pegs 4. This component 2 is attached in a rotatable manner onto a body, e.g. such as a drum 5.

The brush body holders 1 are attached and fitted with the necessary means in such a way as that they extend in the direction of the axis of rotation of the drum 5, while in certain cases (when they are located in front of certain tools) they will automatically rotate to a specific angle. More particularly, as is shown in FIG. 1, this rotation occurs when the brush body holders 1 (and thus also the clamped brush bodies 6) are located in front of the filling mechanism 7. FIG. 1 also shows clearly that although the bundles of bristles are introduced into the brush bodies 6 at an angle, the inflow 8 of the brush bodies 6 and the outflow 9 of the manufactured brushes can occur in a normal manner without requiring certain components to be set at an angle.

A practical and detailed application of the layout in FIG. 1 is shown in FIGS. 2, 3, 4 and 5.

In this application, the component 2 is fixed in a rotatable manner to the drum 5 by means of a small shaft 10 which is firmly attached to this component, with this small shaft 10 fitting exactly into a hollow 11 in the drum 5. The drum 5 is fitted with four flat sides 12 in such a way that the bottom edge 13 of component 2 is able to slide over these sides 12. Component 2 is held against the flat sides 12 by means of stops 14 and 15, the first of which is formed, for instance, by a small component 16 in which a hollow has been made and which is screwed to the drum 5, and the second of which consists, for instance, of a hollow which has been made in a projection of flange 17.

Component 2 is also fitted with a fork 18 in which the devices can grip in order to make the brush body holder 1 rotate at the desired places and/or moments.

In the appliation shown in FIGS. 2-5, the aforementioned devices primarily consist of a peg 19 which engages in the fork 18 provided that a bar 20 is connected to a curve follower 21 and also of a fixed guide 22 to subject this curve follower 21 to a specific movement. The curve follower 21 and a part of the bar 20 are here contained in a cylinder 23 which is attached to the flange 17, and fitted around this bar 20 is a spring 24 which presses the curve follower 21 towards the fixed guide 22.

The fixed guide 22 consists of a circular profiled ring which runs concentrically around the drum 5 and which is attached to the frame 25 of the brush manufacturing machine or suchlike.

The brush body holder 1 as described by the invention is fitted with brush body clamps which are well-known in their own right and which consist of a stop 3 firmly attached to component 2 and, for example, two pegs 4, such that a brush body 6, in this case a toothbrush, can be gripped on one side by the stop 3 and on the other side by the pegs 4. The pegs 4 are slideable in grooves 26 in such a way that they may be tightened against the brush body 6.

Devices are also fitted to operate the brush body clamps. In the application shown in FIG. 3, these consist of a rod 27 located in component 2 and connected to one tip of the pegs 4 and a compression spring 28. These are arranged in such a way that the rod 27 is pushed in one direction under the influence of the compression spring 28 so that the pegs 4 connect up against the brush body. The other, free, tip 29 of the rod 27 extends out of the component 2 in such a way that it may be pressed in, by means of appropriate devices not shown in the figures, in order to enable the brush body clamps to be opened at the desired moment.

The free tip 29 of the rod 27 may move freely back and forth in a groove 30 which is located in the flange 17. The rod 27 may be operated in any appropriate manner.

It is obvious, partly from the figures, that in this application the construction described above is fitted onto the four sides of the drum 5. Furthermore, each of the brush body holders 1 in the application shown is also fitted with a stop 31, located at any suitable position, in order to limit the rotation of the brush body holder 1.

Figure 2:
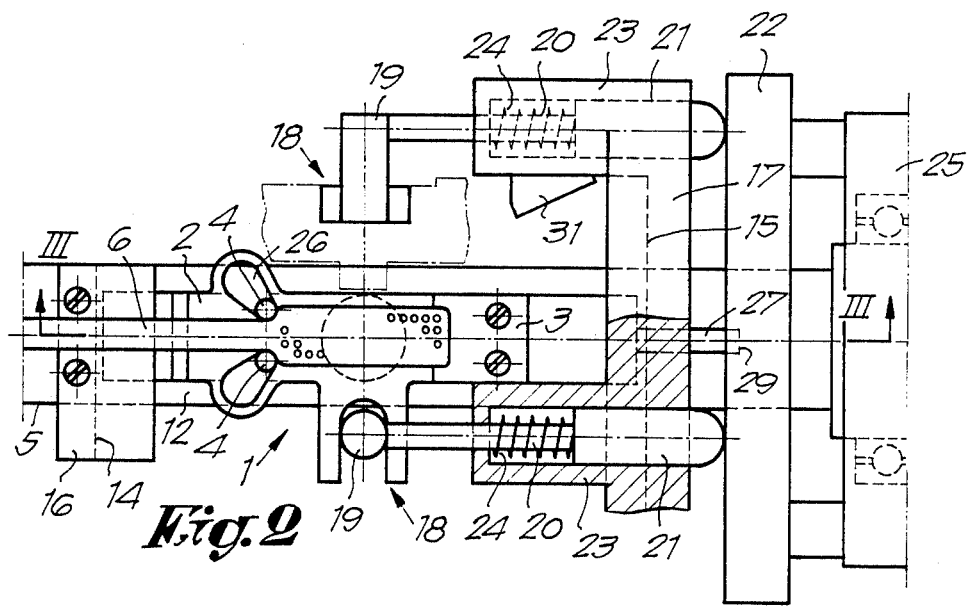
FIG. 2 shows a view in the direction of arrow F2 in FIG. 1, this figure thus showing a practical application.
Figure 3:
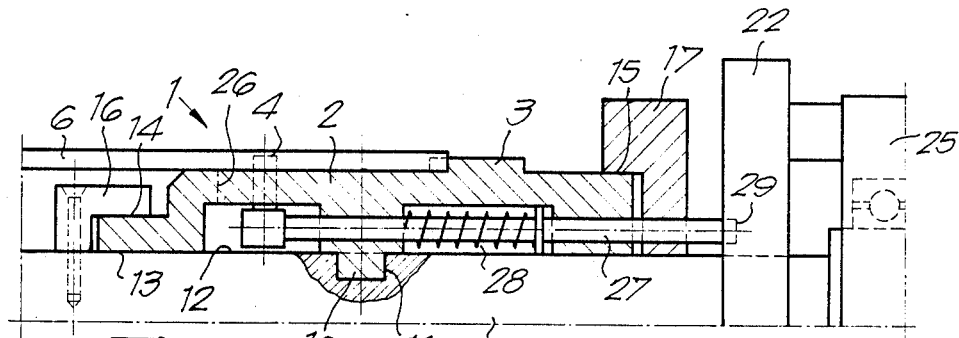
FIG. 3 shows a cross section along line 111—111 in FIG. 2.
Figure 4:
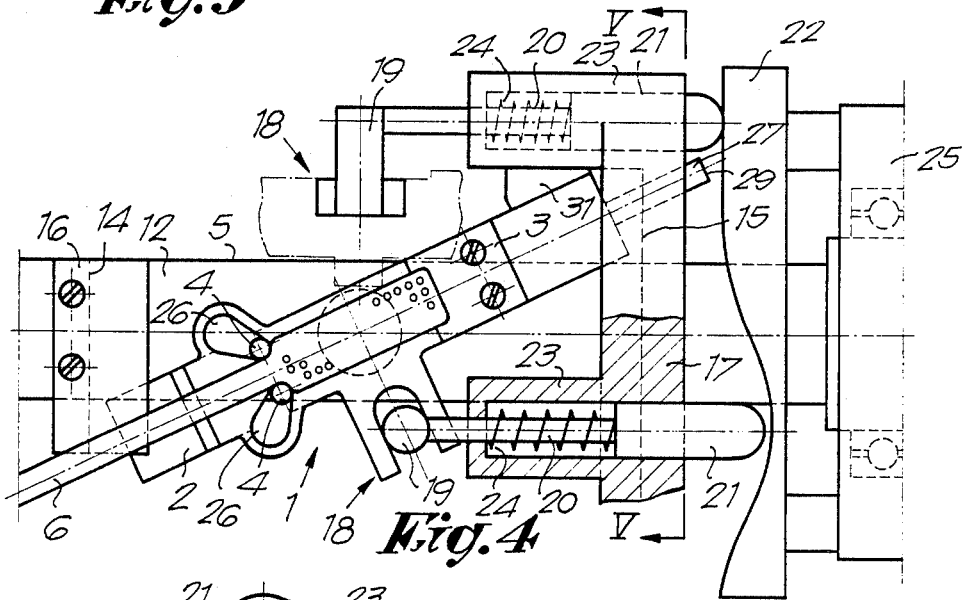
FIG. 4 shows a view in the direction of arrow F4 in FIG. 1 for a practical application, in which this figure also shows the rotated brush body holder from FIG. 2.
Figure 5:
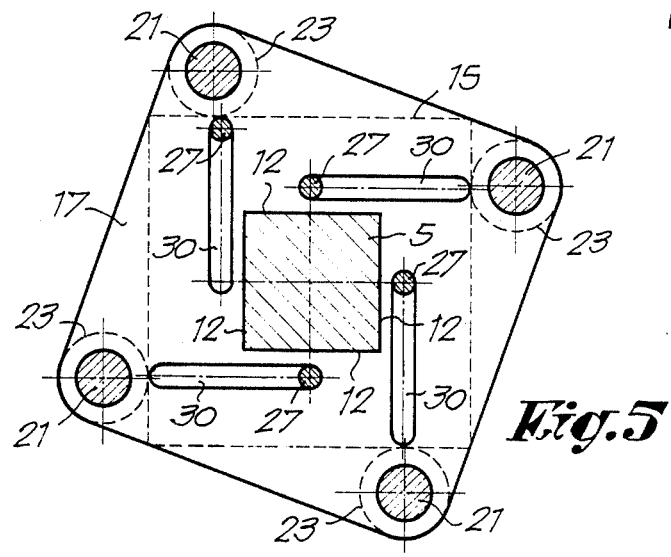
FIG. 5 shows a cross section along line V—V in FIG. 4.

The operation of the invention may easily be deduced from the figures. Whenever tha drum 5 is rotated through 90°, the curve follower 21 slides over the fixed guide 22 and, depending upon the profile of the fixed guide 22, this curve follower 21 will be respectively inserted into or withdrawn from the cylinder 23. In the unrotated state, as shown in FIG. 2, the curve follower 21 is in its pressed in position. FIG. 4 shows a rotated brush body holder, in which the rotation has been obtained by the curve following component 21 having been able to move out of the cylinder 23, and in which the rectilinear movement of this curve follower 21 has been converted into a rotation of the component 2 by means of the bar 20, the pin 19 and the engagement of this pin 19 in the fork 18.

In the application shown in the figures, when the brush body holder 1 rotates, the curve follower 21 disengages completely from the fixed guide 22 and the angle of the rotation is determined by the stop 31. It is obvious that this stop 31 does not necessarily have to be a fixed stop, but may, for example, be composed of an adjusting screw, thus enabling adjustment of the angle obtained. It is also obvious that the fixed stop 31 may be omitted if care is taken to ensure that the curve follower 21 remains permanently in contact with with the fixed guide 22, in which case this latter must be fitted with an appropriate profile such as to give the desired angle setting.

This last variation may be used to change over to another angle by replacing the fixed guide 22 by another fixed guide with a different profile.

The centre of rotation of the brush body holder should preferably but not necessarily be located such that it is in the centre of that part of the brush bodies into which the bristles are fitted.

The present invention is in no way limited to the application described and shown in the accompanying sketches by way of an example; such an improved brush body holder and also the mechanisms to rotate it may be produced in all shapes and sizes without extending beyond the scope of the invention.

I claim:

1. An assembly for holding a brush body, comprising:
   a carrier of a brush manufacturing machine, the assembly being fitted in the carrier; and
   a holder for holding the brush body for the insertion of bristles which are inserted along an insertion axis, said holder being rotatably mounted on the carrier so as to rotate around an axis parallel to said insertion axis.

2. An assembly according to claim 1, including means for automatically rotating said holder to a predetermined position for receiving the bristles.

3. An assembly according to claim 2, wherein: said holder is rotated by a rotatable linkage secured between said holder and the carrier.

4. An assembly according to claim 3, wherein: said rotatable linkage comprises a small shaft which is firmly attached to said holder and which extends into a hollow in the carrier.

5. An assembly according to claim 3 wherein, said rotatable linkage comprises a curve follower which is attached to said holder and which is pressed against a fixed guide by means of a spring such that the movement of said curve follower imparts specific angular rotation to said holder.

6. An assembly according to claim 1, and further comprising: a curve follower which is attached to said holder and which is pressed against a fixed guide by means of a spring such that the movement of said curve follower imparts a specific angular rotation to said holder.

7. An assembly according to claim 6 wherein, said curve follower is coupled to said holder by means of a pin and fork linkage.

8. An assembly according to claim 6 wherein, said fixed guide comprises a profiled template or ring which is attached in a stationary manner to the frame of the brush manufacturing machine whereby said curve follower follows the profile.

9. An assembly according to claim 8 wherein: said follower is no longer in contact with said fixed guide when said holder is in contact with a stop which is attached to the carrier.

10. An assembly for positioning and holding a brush body for insertion of bundles of bristles into holes in the brush body, comprising:
- a fixed guide;
- a carrier movable relative to said fixed guide;
- a follower slidably supported by said carrier to slide in a lateral direction and having one end continuously outwardly biased against said fixed guide; and
- a holder means for holding the brush body rotatably secured to said carrier for rotating around a longitudinal axis and pivotally connected to the other end of said follower so that when said carrier moves relative to said fixed guide, said follower slides laterally to continually contact said fixed guide and said holder means pivots about said longitudinal axis in response to lateral movement of said follower.

11. An assembly as claimed in claim 10 wherein:
said holder means is pivotally connected to said follower by means of a fork integral with said holder means and a cylindrical end integral with said follower and slidable in said fork.

12. An assembly as claimed in claim 11 and further comprising:
a stop mounted on said carrier to limit the travel of said holder means.

* * * * *